US011070321B2

(12) United States Patent
Vanini

(10) Patent No.: US 11,070,321 B2
(45) Date of Patent: Jul. 20, 2021

(54) ALLOWING PACKET DROPS FOR LOSSLESS PROTOCOLS

(71) Applicant: Cisco Technology, Inc., San Jose, CA (US)

(72) Inventor: Erico Vanini, Balerna (CH)

(73) Assignee: Cisco Technology, Inc., San Jose, CA (US)

( * ) Notice: Subject to any disclaimer, the term of this patent is extended or adjusted under 35 U.S.C. 154(b) by 10 days.

(21) Appl. No.: 16/172,708

(22) Filed: Oct. 26, 2018

(65) Prior Publication Data

US 2020/0136761 A1 Apr. 30, 2020

(51) Int. Cl.
| | |
|---|---|
| *H04L 12/863* | (2013.01) |
| *H04L 12/841* | (2013.01) |
| *H04L 12/835* | (2013.01) |
| *H04L 12/825* | (2013.01) |
| *H04L 12/823* | (2013.01) |
| *H04L 12/801* | (2013.01) |
| *H04L 12/26* | (2006.01) |
| *H04L 1/18* | (2006.01) |
| *H04L 1/16* | (2006.01) |

(52) U.S. Cl.
CPC .......... *H04L 1/1806* (2013.01); *H04L 1/1809* (2013.01); *H04L 1/189* (2013.01); *H04L 43/0829* (2013.01); *H04L 47/17* (2013.01); *H04L 47/26* (2013.01); *H04L 47/283* (2013.01); *H04L 47/30* (2013.01); *H04L 47/32* (2013.01); *H04L 47/62* (2013.01); *H04L 1/1635* (2013.01); *H04L 1/1657* (2013.01)

(58) Field of Classification Search
CPC ... H04L 1/1809; H04L 47/62; H04L 43/0829; H04L 47/17; H04L 47/32; H04L 47/283; H04L 47/30; H04L 1/1657; H04L 1/1806; H04L 47/26; H04L 1/189; H04L 1/1635; H04L 1/1874; H04L 1/1896; H04L 1/1854; H04L 43/0876; H04L 43/0864
See application file for complete search history.

(56) References Cited

U.S. PATENT DOCUMENTS

| | | | |
|---|---|---|---|
| 6,700,871 B1 | 3/2004 | Harper et al. | |
| 7,664,026 B2 | 2/2010 | Huang et al. | |
| 7,787,367 B2 | 8/2010 | Gusat et al. | |
| 8,767,561 B2 | 7/2014 | Gnanasekaran et al. | |
| 8,831,008 B1 | 9/2014 | Gostev et al. | |
| 9,414,094 B2 | 8/2016 | Van Zijst | |
| 2008/0181104 A1* | 7/2008 | Hoban | H04L 43/16 370/230 |
| 2009/0319851 A1* | 12/2009 | Li | H04L 1/1854 714/749 |
| 2014/0172994 A1 | 6/2014 | Raumann et al. | |

(Continued)

*Primary Examiner* — Moo Jeong
(74) *Attorney, Agent, or Firm* — Patterson + Sheridan, LLP

(57) ABSTRACT

Techniques for dropping packets at congested network elements for no drop traffic are described. A network element in communication with a congested network element initiates a copy packet queue and stores a copy of each transmitted no-drop packet sent to the congested element. When the network element receives an indication that the congested element has dropped a no-drop packet, the network element begins retransmission of the dropped packets to the congested element from the copy packet queue, thus providing a lossless network while allowing for dropped packets.

20 Claims, 8 Drawing Sheets

(56) References Cited

U.S. PATENT DOCUMENTS

| | | | |
|---|---|---|---|
| 2015/0271244 A1* | 9/2015 | Bloch | H04L 69/40 709/217 |
| 2018/0004705 A1* | 1/2018 | Menachem | G06F 15/17331 |
| 2018/0026899 A1* | 1/2018 | Lee | H04L 43/0864 370/230 |

* cited by examiner

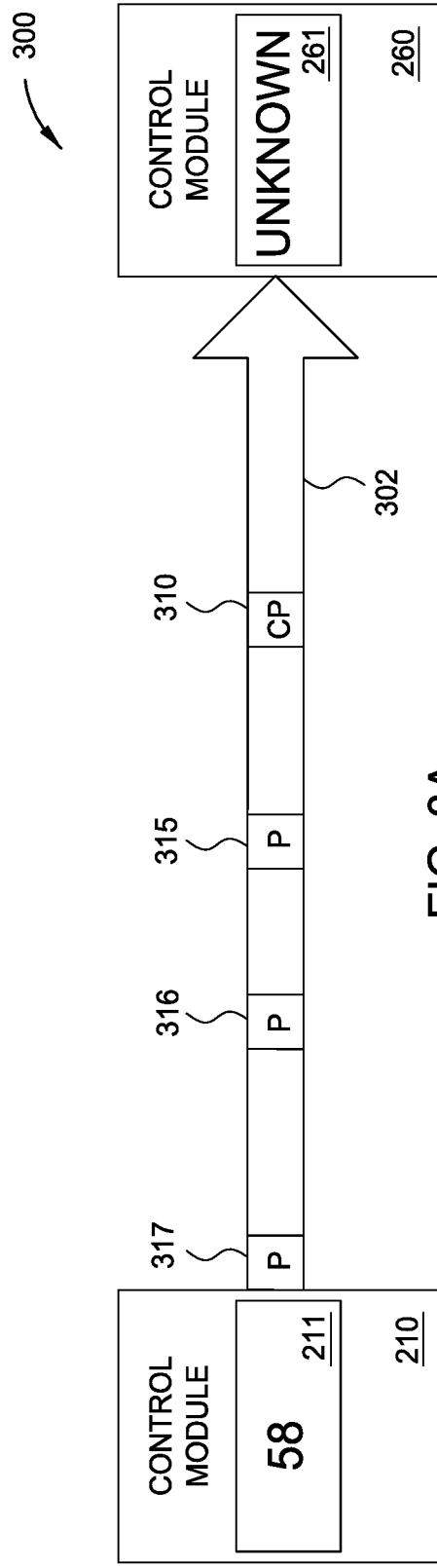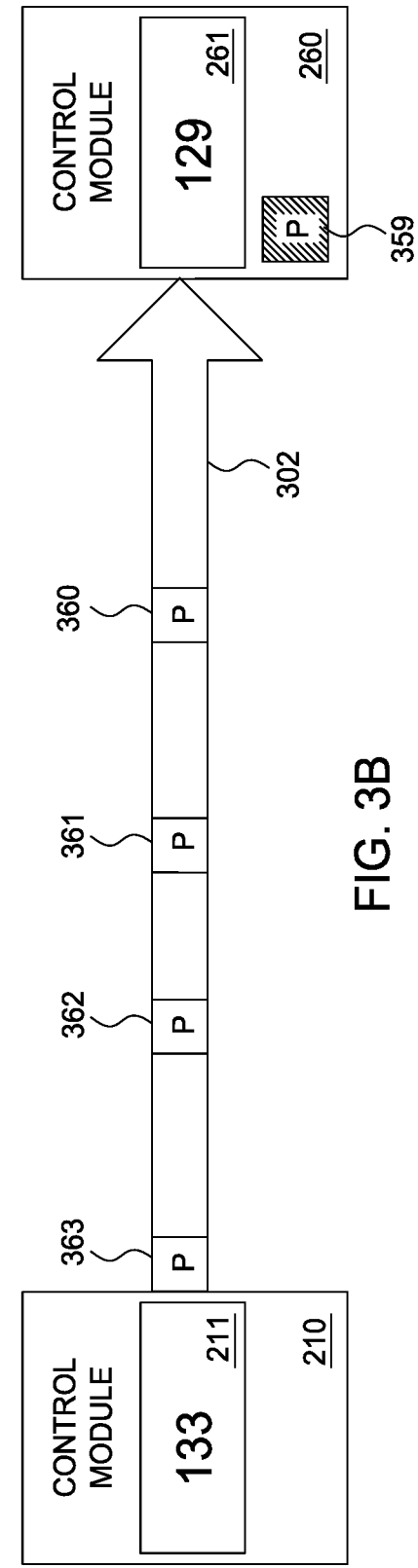

US 11,070,321 B2

ALLOWING PACKET DROPS FOR LOSSLESS PROTOCOLS

TECHNICAL FIELD

Embodiments presented in this disclosure generally relate to providing network transmissions for a lossless protocol in a network. More specifically, embodiments disclosed herein allow for packet drops in a lossless protocol by buffering packets for transmission and retransmitting any dropped packets in a lossy network.

BACKGROUND

In computing networks different components and network elements can become oversubscribed or congested such that the network element may not efficiently process all of the network traffic. The congested network elements then implement various types of congestion protocols to ease the congestion and restore normal processing of the network traffic. For example, a congested network switch may implement a PAUSE protocol which will eventually reduce the amount of incoming traffic received at the congested switch and allow the traffic handling processing resources of the switch to attempt to process the traffic already received at the network switch.

In some examples, such as in lossless or no-drop protocols, the congested network elements may execute a congestion protocol, but must still ensure that no packets are dropped. This results in the congested network elements continuing to receive network traffic that it must process and store, even when congested. In some examples, the congested network elements then remain congested for longer periods of time, even after congestion protocols are implemented, because processing resources and buffer space are being used to handle lossless protocol traffic.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A and 3B illustrate packet streams, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
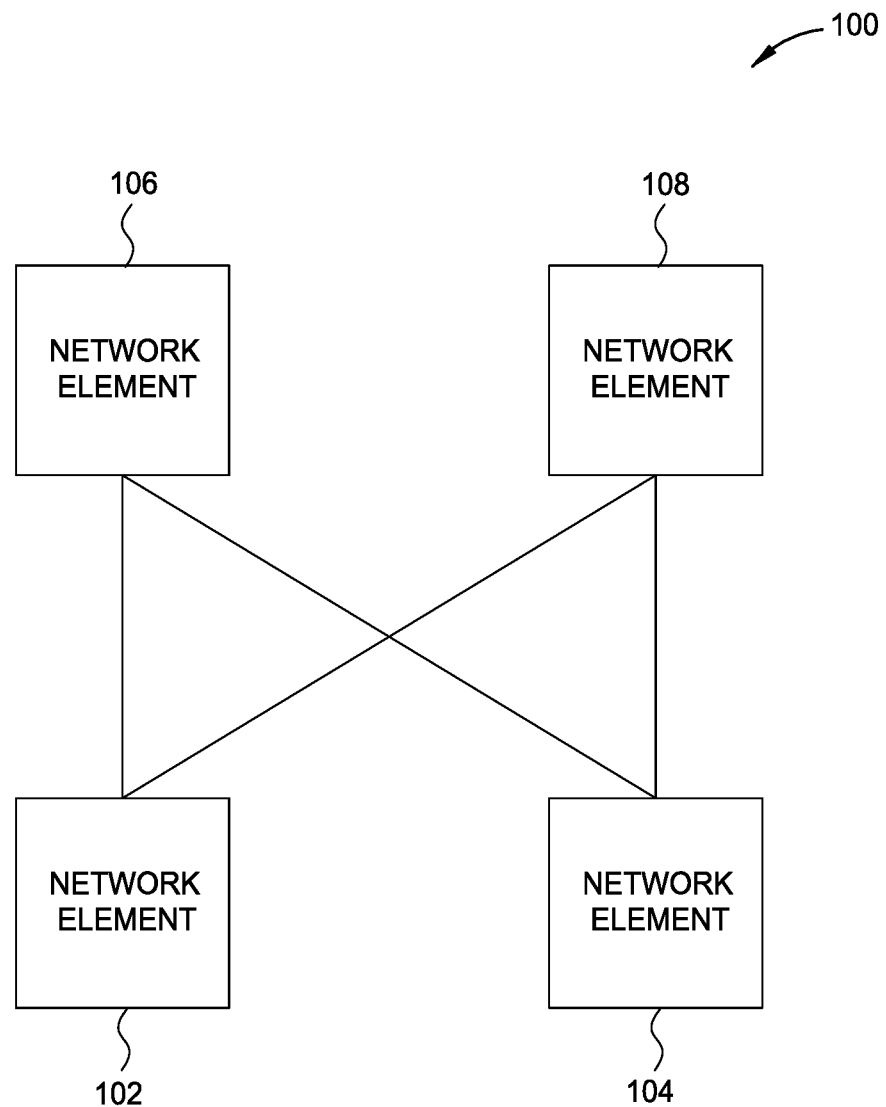
FIG. 1 illustrates a network, according to one embodiment.

One embodiment presented in this disclosure includes a system of one or more computers which can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: initiating at a first network element a copy packet queue for transmitted packets and transmitting a packet stream from the first network element to a second network element from a standard packet queue, where a packet copy for a packet transmitted in the packet stream is also stored in the copy packet queue at the first network element when transmitted. The method also includes receiving a drop packet notification at the first network element from the second network element, where the drop packet notification identifies a dropped packet and retransmitting the packet stream from the first network element to the second network element from the copy packet queue, where the retransmitted packet stream begins transmission at a packet copy in the packet queue correlating to the dropped packet. Other embodiments of this aspect include corresponding computer systems, apparatus, and computer programs recorded on one or more computer storage devices, each configured to perform the actions of the methods.

For example, another embodiment includes a system, including: a processor and a memory including instructions which, when executed on the processor, performs an operation. The operation includes initiating at a first network element a copy packet queue for transmitted packets and transmitting a packet stream from the first network element to a second network element from a standard packet queue, where a packet copy for a packet transmitted in the packet stream is also stored in the copy packet queue at the first network element when transmitted. The operation also includes receiving a drop packet notification at the first network element from the second network element, where the drop packet notification identifies a dropped packet and retransmitting the packet stream from the first network element to the second network element from the copy packet queue, where the retransmitted packet stream begins transmission at a packet copy in the packet queue correlating to the dropped packet.

Another example embodiment presented in this disclosure includes a computer program product including a non-transitory computer-readable medium program having program instructions embodied therewith, the program instructions executable by a processor to perform an operation. The operation includes: initiating at a first network element a copy packet queue for transmitted packets and transmitting a packet stream from the first network element to a second network element from a standard packet queue, where a packet copy for a packet transmitted in the packet stream is also stored in the copy packet queue at the first network element when transmitted. The operation also includes receiving a drop packet notification at the first network element from the second network element, where the drop packet notification identifies a dropped packet and retransmitting the packet stream from the first network element to the second network element from the copy packet queue, where the retransmitted packet stream begins transmission at a packet copy in the packet queue correlating to the dropped packet.

Example Embodiments

As described above, congested network elements can experience high levels of congestion when processing network traffic. When the network element is part of a lossless protocol, the network element ensures that every packet received is processed even when the network element is congested. This can prolong and exacerbate the congestion at the network element even when congestion protocols (e.g., Explicit Congestion Notification (ECN), Data Center Quantized Congestion Notification (DCQCN), etc.) have been implemented to attempt to relieve the congestion. These problems can often occur when there are incast conditions in the network (e.g., many types of traffic being received at one network element). Additionally, allowing for packet drops in existing protocols results in either reordering of packets upon receiving the dropped packet again and/or requires significant amounts of signaling between network elements in order to keep track of which packets are received and/or dropped.

The system described herein provides for packet drops in a lossless protocol on a lossy network. To allow for congestion alleviation at a receiving network element, a connected transmitting network element keeps a copy of the lossless data stream (packet stream) that is transmitted to the congested element. When the receiving element drops a packet and/or packets, such as when the receiving element is congested, the transmitting network element can then retransmit the lossless data stream starting with the dropped packet, thus providing no-drop traffic, without adding large amounts of additional signaling between the network elements. As also described herein, this system frees buffer space and reduces processing requirements at congested network elements and moves the storage and assurance of no-drop delivery to network elements with unused and/or available buffer space and processing resources. While this increases the buffer space used at the transmitting network element, it provides more efficient use of the aggregated buffer space across all network elements (e.g., utilizing empty buffer space at non-congested elements).

Additionally, as described herein, the amount of buffer space used to store the copy of the lossless data stream only needs to be large enough to store potential in-transit packets (e.g., packets that are being transmitted to the receiving element). The buffer clears stored packets after a certain time when it is ensured that the packets are received and not dropped by the receiving element based on the latency and/or round trip time (RTT) from the transmitting network element to the receiving element.

Turning now to, FIG. 1 which illustrates a network, according to one embodiment. As shown, the network 100 includes network elements 102, 104, 106, and 108. In some examples, the network element 104 is experiencing congestion, such as incast caused congestion from network traffic received from both network element 106 and network element 108. As described herein, the network element 104 can begin dropping no-drop network traffic when it is congested and the network elements 104 and 106 will retransmit the no-drop network traffic to the network element 104.

Figure 2:
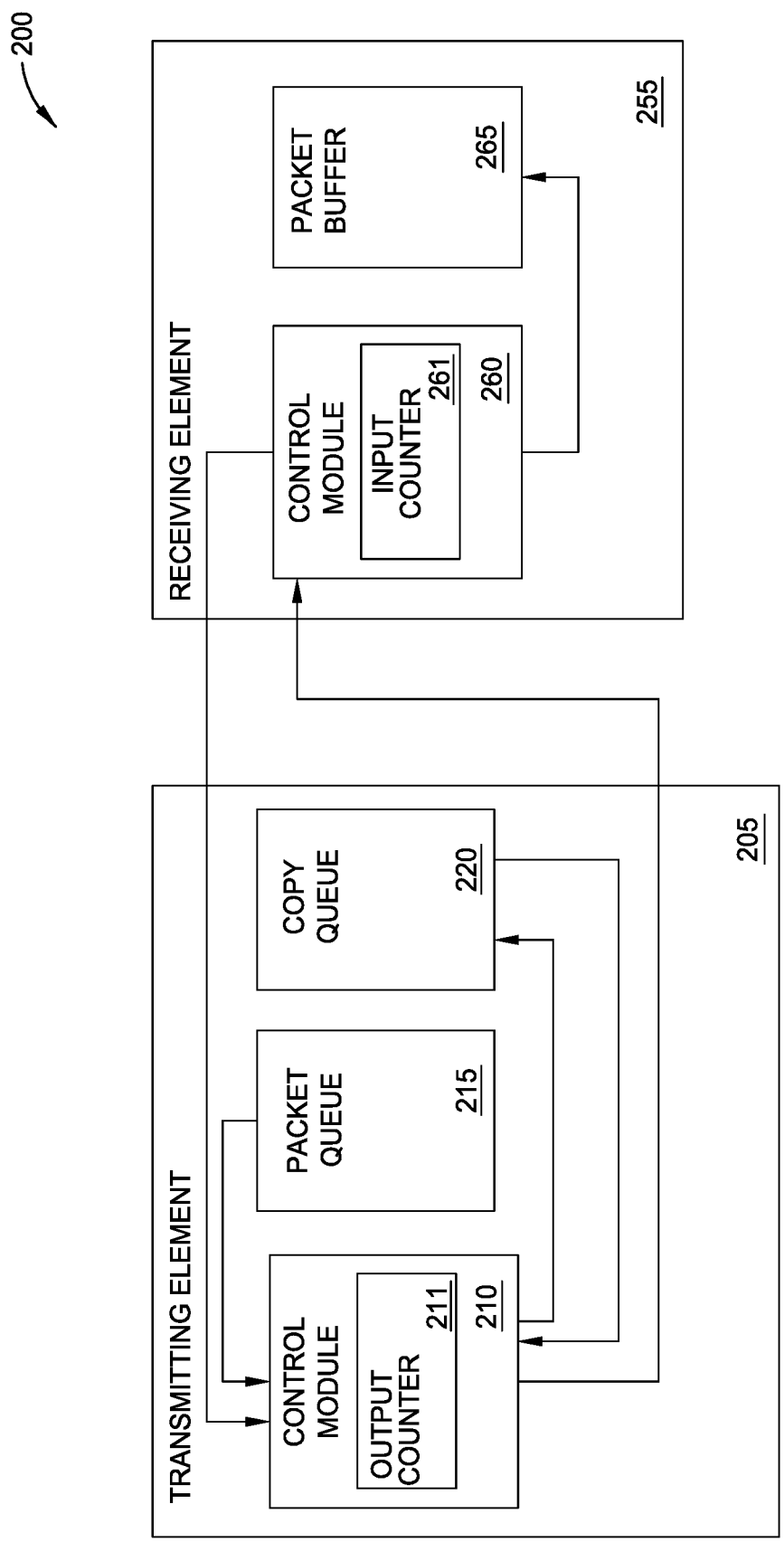
FIG. 2 is a block diagram of a system to provide for packet drops in a lossless protocol, according to one embodiment.

FIG. 2 is a block diagram of a system for to provide for packet drops in a lossless protocol on a lossy network, according to one embodiment. As shown, a transmitting network element 205 is in communication with a receiving element 255. In some examples, transmitting network element 205 and the receiving element 255 are connected by one hop in the network (e.g., network element 106 and network element 104). For example, each hop in a network will provide for packet drops in a lossless protocol independently and, if necessary, propagate the congestion back to the previous hop in the network. In another example, the transmitting network element 205 and the receiving element 255 are connected over multiple hops, such as if a network element (e.g., 106) does not support the methods described herein. In this example, network elements 102 and 104 will act as if 106 was not present, as a single hop. In some examples, the receiving element 255 is a congested network element, such as network element 104. The receiving element 255 includes a control module 260, which includes an input packet counter 261. The receiving element also includes a packet buffer 265 for received network packets. In some examples, the packet buffer of the receiving element acts as the packet queue for the next hop in the network from the receiving element 255, (e.g., the packet buffer 265 functions as the packet queue 215 described below for the receiving element 255 when transmitting to the next hop in the network).

As shown, the transmitting network element 205 includes a control module 210, including an output packet counter 211. The transmitting network element also includes a packet queue 215 and a copy packet queue 220. As described herein, when the receiving element 255 determines that congestion is occurring and/or congestion will occur soon, the control module 260 sends a control packet to the control module 210 indicating congestion may occur. In response, the control module 210 initiates the copy packet queue 220 for transmitted packets, and starts the output packet counter 211. Only initiating the copy packet queue 220 when congestion is occurring allows for storage space to be preserved at the transmitting network element. Alternatively, in some examples, the copy packet queue 220 executes continuously despite congestion conditions at the receiving element 255, which provides for instant retransmission if packets are dropped.

The control module 210 also maintains a copy packet queue 220 and a output packet counter 211 for each connected receiving network element, such that if multiple network elements connected to the transmitting network element 205 experience congestion, the control module 210 can respond to each one. Likewise, the control module 260 also maintains an input packet counter for each connected transmitting network element in order to provide for dropping packets from each connected transmitting network element. For example, the network element 104 maintains an input packet counter for both network element 106 and network element 108, when congested.

FIG. 3A illustrates a packet stream, according to one embodiment described herein. In some examples, the packet stream 302 is a packet stream from the transmitting network element 205 to the receiving network element 255. The packet stream 302 includes packets 315-317 which are data packets such as a standard packets in a network data stream from the transmitting network element 205 to the receiving network element 255. For example, the packets 315-316 are transmitted from the control module 210 from the packet queue 215. As shown in FIG. 3A, the control module 210 has incremented the output packet counter 211 to "58" indicating that the last packet sent from the control module 210, packet 317, is identified by the control module as packet "58," i.e. packet count 58. As shown, the packet stream 302 also includes a control packet 310. In some examples, the control packet 310 is transmitted from the control module 210 after receiving a congestion indication from the control module 260, and also indicates to the control module 260 that the copy packet queue 220 has been initiated and that no-drop packets may now be dropped at the control module 260.

In some examples, the control packet 310 includes a packet count from the output packet counter 211 for the next packet received in the packet stream 302. The control module 260 then updates an unknown value at input packet counter 261 to synchronize with the output packet counter 211. For example, the control packet 310 indicates to the control module 260, that packet 315 should be counted as "56." Thus control module 260 counts packet 315 as "56", packet 316 as "57" and packet 317 as "58." In some examples, such as after significant congestion and/or several retransmission attempts, the control module 210 may transmit another control packet such as control packet 310, to ensure the input packet counter 261 is synchronized with the output packet counter 211.

FIG. 3B illustrates a packet stream, according to one embodiment described herein. For example, the packet stream 302 has continued after the synchronization of the counters discussed in FIG. 3A. In this example, the receiving network element 255 is now experiencing congestion and has determined it needs to start dropping packets received from the transmitting network element 205 in the packet stream 302. For example, when the buffer 265 is full and cannot store anymore packets, the control module 260 will begin dropping packets. As shown, the control module drops packet 359, which is counted by the control module 260 as packet "129." As described herein, at least packets 359, 360, 361, 362, and 363 are stored in the copy packet queue 220 and can be retransmitted once the control module 260 indicates the packets have been dropped.

Figure 4A:
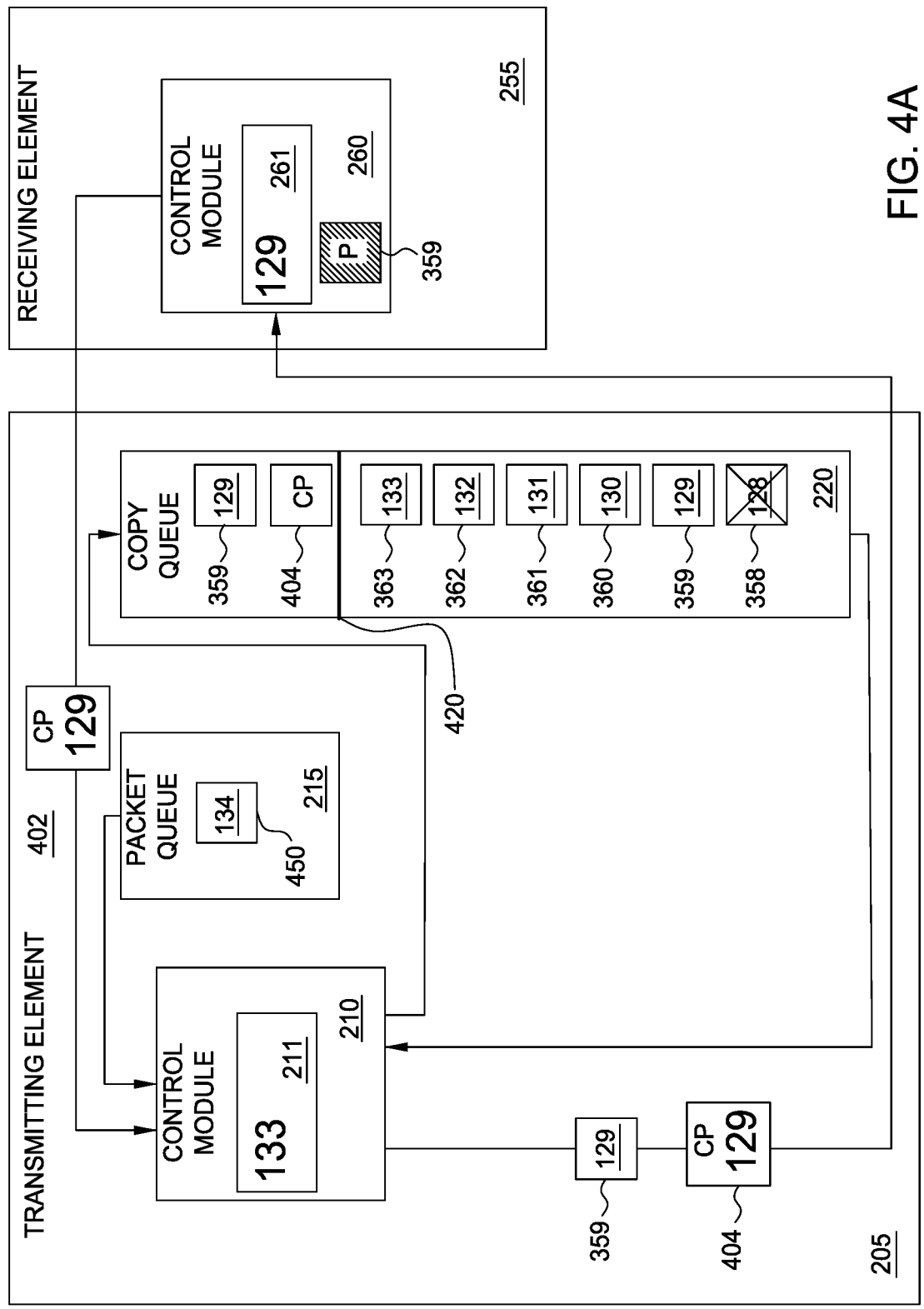
FIG. 4A illustrates a system stream diagram for providing for packet drops in a lossless protocol, according to one embodiment.

FIG. 4A illustrates a system flow diagram for providing for packet drops in a lossless protocol, according to one embodiment. As described in relation to FIG. 3B, the receiving element 255 has dropped the packet 359 (packet count 129). Upon dropping the packet 359, the control module 260 transmits a control packet 402 identifying the packet 359 (packet count 129) as dropped. In some examples, the rest of the packets transmitted from the control module 210 during the time from the receiving element 255 dropping packet 359 and a retransmission of the packets, may also be dropped without notification from the control module 260 to control module 210, since the entire packet stream will be retransmitted from the transmitting network element 205, beginning with the dropped packet. In some examples, the control packet 402 also includes a back-off and/or wait time determined at the control module 260. The control module 210 then delays retransmission of the packet stream 302 according to the back-off time.

As shown in the copy packet queue 220, the control module 210 has copied and stored the transmitted packets in the packet stream 302 into the copy packet queue. As described herein, the copy packet queue 220 only includes transmitted packets that can still be in transit (e.g., could still be dropped by the control module 260). For example, packets including the packet count 56-59 described in relation to FIG. 3A would be cycled out or flushed from the copy packet queue 220 after a period of time (e.g., after the RTT of a packet from the transmitting network element 205 and the receiving element 255).

Once the control module 210 receives the control packet 402, the control module 210 pauses transmitting packets from the packet queue 215 and also pauses incrementing the output packet counter 211 since packet 450 (packet count 134) in the packet queue will not be transmitted until retransmission is complete. The control module also flushes any packets in the copy packet queue known to be received and not dropped by the control module 260. For example, packet 358 (packet count 128) is inferred to be received and not dropped since the control packet 402 indicates the packet 359 (packet count 129) is dropped. The control module 211 begins retransmission of the packet stream 302 from the copy packet queue 220, beginning the retransmission with packet 359. As shown in FIG. 4, the control module 210 includes a control packet 404 identifying both the start of retransmission and the packet count of the next packet in the packet stream 302. Upon transmitting the control packet 404 and retransmitting the packet 359, both the control packet 404 and the retransmitted packet 359 are copied back into the copy packet queue 220 to ensure that if subsequent packets are dropped during the retransmission, the packets can be retransmitted again. In one example, the copy packet queue 220 may also be flagged with retransmission flag 420 to indicate the beginning of the retransmitted packets in the copy packet queue 220.

Figure 4B:
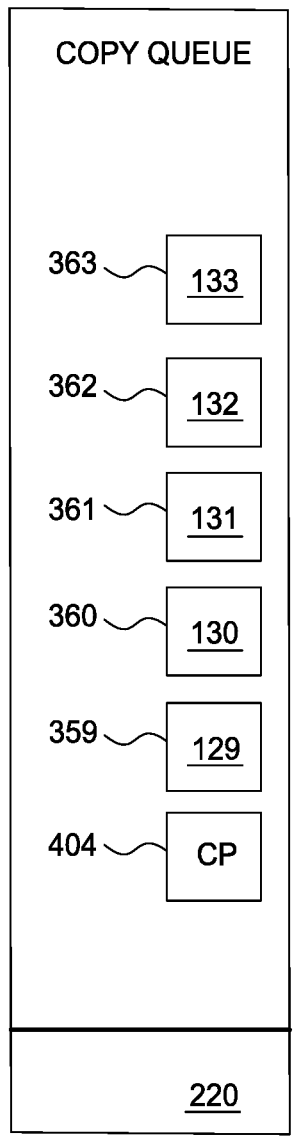
FIGS. 4B and 4C illustrate copy packet queues, according to embodiments.

In one example, when the receiving element 255 does not drop any packets during the retransmissions of the packets, once the packets 359-363 have been retransmitted, the control module 210 will flush each of the packets from the copy packet queue 220 and restore a copy from the copy packet queue. For example, as shown in FIG. 4B, the packet stream 302 is retransmitted beginning with packet 359 such that the retransmission flag 420 and the control packet 404 are at the bottom of the copy packet queue. When the control module 210 detects the retransmission flag 420 and/or the control packet 404 at the bottom of the queue, the transmission of the packet stream 302 from the packet queue 215 begins again with packet 450 (packet count 134).

Figure 4C:
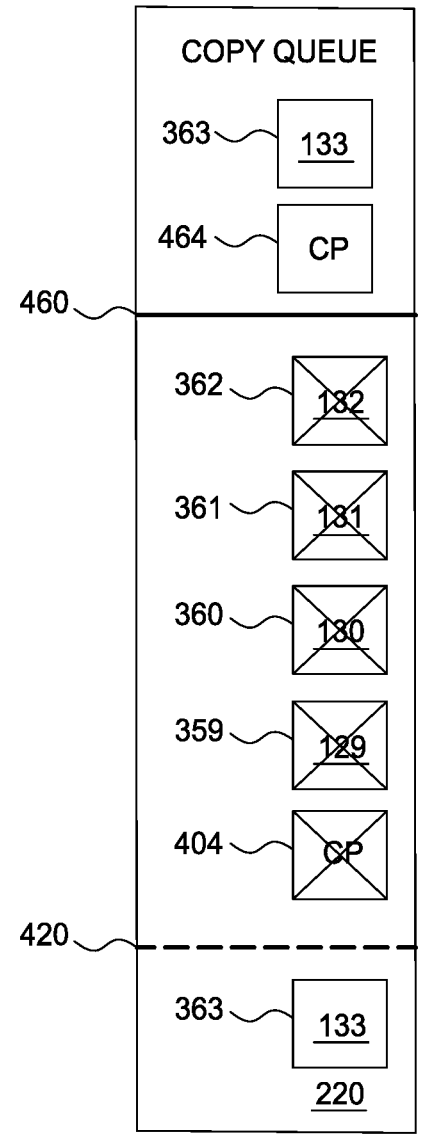

In one example, the receiving element 255 drops additional packets during the retransmissions of the packets. For example, the control module 260 may drop the packet 363 (packet count 133) and send a control message to the control module 210 indicating the dropped packet. The control module 210 can then flush the control packet 404 and the packets 359-362 as shown in FIG. 4C, since it is inferred that the packets have been received and not dropped by the receiving network element 255. The control module 210 begins retransmission of the packet stream 302 with the packet 363 (packet count 133) along with control packet 464 identifying both the start of retransmission and the packet count of the next packet in the packet stream 302. As also shown in FIG. 4C, the control packet 464 and the retransmitted packet 363 are stored in the copy packet queue 220 (along with a retransmission flag 460 in some examples).

Figure 5:
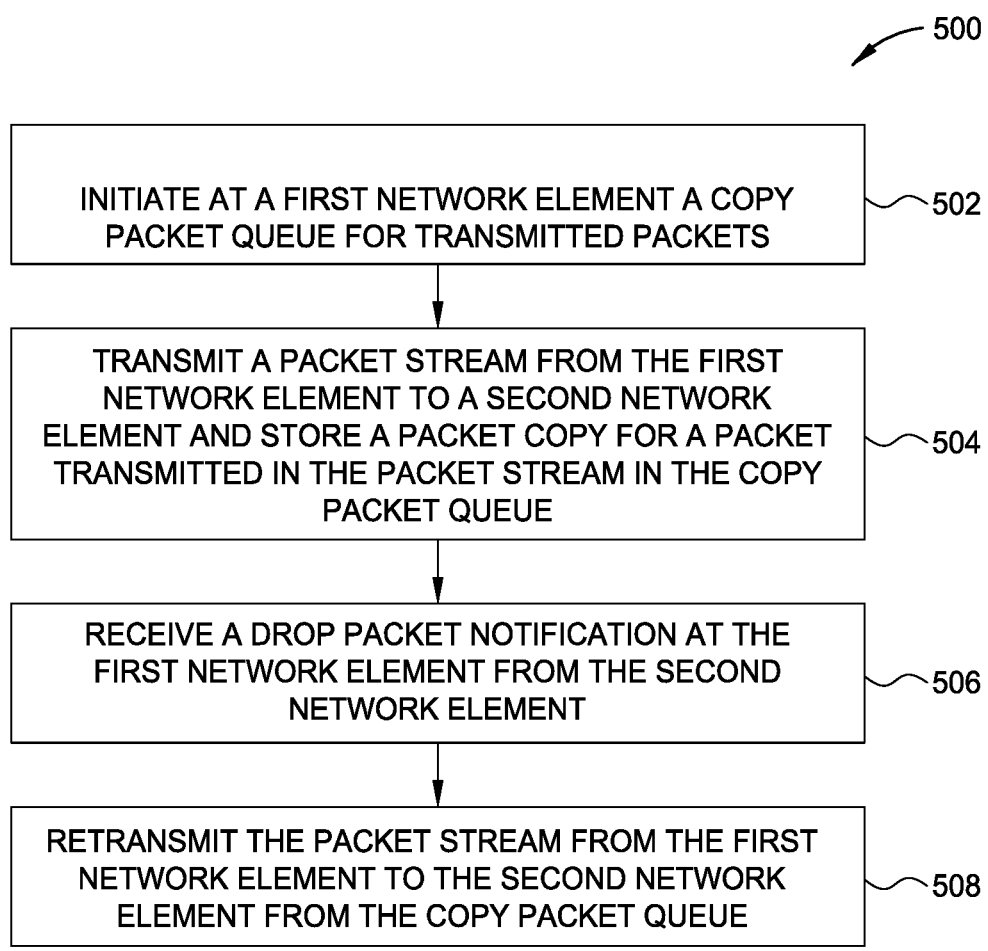
FIG. 5 is a method for providing for packet drops in a lossless protocol, according to one embodiment.

FIG. 5 is a method for providing for packet drops in a lossless protocol, according to one embodiment. Method 500 begins at block 502 where a network element, such as transmitting network element 205, including control module 210, initiates at a first network element a copy packet queue for transmitted packets. In some examples, the control module 210 initiates the copy packet queue in response to a congestion notification from a connected network element. For example, as shown in FIG. 1, when the network element 104 approaches or begins experiencing congestion, such as when receiving large amounts of incast data from connected network elements 106 and 108, the network element (embodied as the receiving element 255) transmits a congestion indication to the network elements 106 and 108. Each of the network elements (both embodied as a transmitting network element 205) then initiates a copy packet queue for their respective packet streams to the network element 104.

In another example, the control modules (e.g., control module 210) at the network elements 106 and 108 may persistently maintain a copy packet queue, such as copy packet queue 220, to respond immediately to congestion conditions. In this example, the copy packet queue is initiated when a packet stream is initiated between the network elements 106 and 108 and the network element 104.

At block 504, the transmitting network element 205, including control module 210, transmits a packet stream from the first network element to a second network element from a standard packet queue. While transmitting the packet stream, the control module 210 also stores a packet copy for a packet transmitted in the packet stream in the copy packet queue at the first network element. For example, as shown in FIGS. 2 and 4, during the transmission of packet stream 302, as each packet is transmitted from the packet queue 215, the control module 260 replicates the transmitted packets and stores the copy of the transmitted packet in the copy packet queue 220. In some examples, the copy packet queue 220 functions as a loop recording queue or a looping queue, such that when the copy packet queue is full (e.g., the allocated buffer space is full), the oldest (first received) copied packet is flushed or discarded from the packet queue 220 upon storing the newest copied packet. In this example, the flushed oldest copied packet is considered as received by the receiving element 255, since the copy packet queue is allocated enough space to guarantee that all in-transit packets have a storage space based on the RTT between the receiving element and the transmitting network element (as further described herein).

In some examples, once the copy packet queue is initiated, and prior to the transmission of the packet stream, the control module 210 transmits a synchronization packet from the first network element to the second network element prior to transmitting the packet stream. For example, as described in relation to FIG. 3A, the control module 210 transmits the control packet 310 as a synchronization packet. In some examples, the synchronization packet (control packet 310) indicates that the copy packet queue 220 has been initiated and that no-drop packets may now be dropped at the control module 260 and also includes a count from the output packet counter 211 for the next packet received in the packet stream 302. This allows for both the control module 260 and the control module 210 to track the packets in the packet stream 302

At block 506, the transmitting network element 205, including control module 210, receives a drop packet notification at the first network element from the second network element, where the drop packet notification identifies a dropped packet. For example, as discussed in relation to FIG. 4A, the transmitting network element 205 receives the drop packet notification (control packet 402) from the receiving network element 255. In some examples, the drop packet notification (control packet 402) identifies the packet dropped at the receiving network element. For example, the control packet 402 identifies the packet 359 (packet count 129) as dropped by the receiving network element. In some examples, the rest of the packets transmitted from the control module 210 during the time from the receiving element 255 dropping packet 359 and a retransmission of the packets, may also be dropped without notification from the control module 260 to control module 210, since the entire packet stream will be retransmitted from the transmitting network element 205, beginning with the dropped packet. In some examples, the drop packet notification (control packet 402) also includes a back-off and/or wait time determined at the control module 260. The control module 210 then delays retransmission of the packet stream 302 according to the back-off time.

At block 508, the transmitting network element 205, including control module 210, retransmits the packet stream from the first network element to the second network element from the copy packet queue, where the retransmitted packet stream begins transmission at a packet copy in the packet queue correlating to the dropped packet. For example, as discussed in relation to FIG. 4A, the packet stream 302 is retransmitted beginning with the packet 359 (packet count 129). In some examples, prior to retransmitting the copied packet 359, the control module transmits a control packet such as control packet 404. identifying both the start of retransmission and the packet count of the next packet in the packet stream 302, such that the receiving element 255 input packet counter is synchronized with the packets received from the transmitting network element 205. As described herein, in some examples, the retransmission of the packet stream is delayed according to a back-off or wait time received from the receiving element 255.

Figure 6:
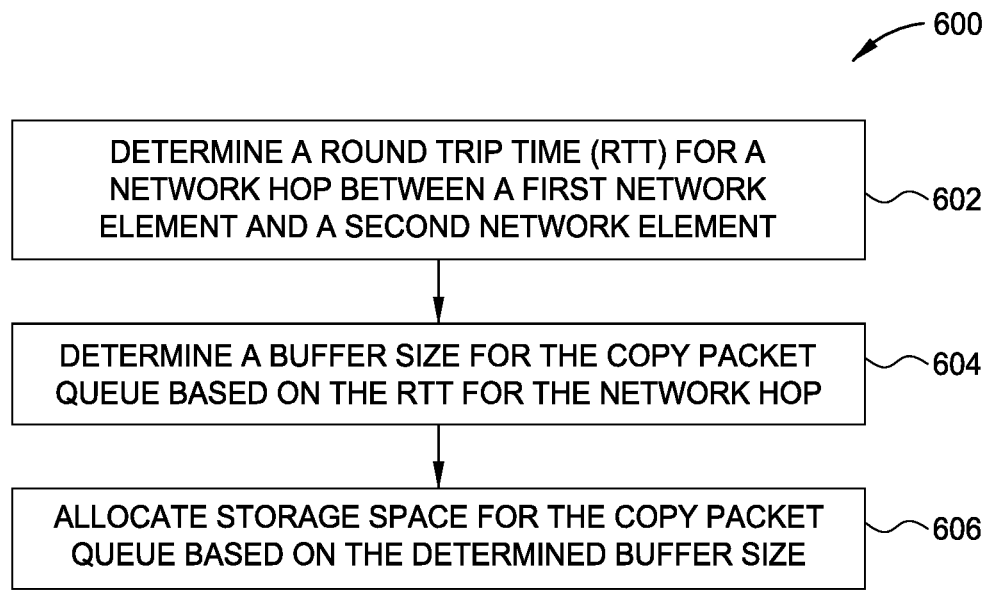
FIG. 6 is a method for initiating a copy packet queue, according to one embodiment.

FIG. 6 is a method for initiating a copy packet queue, according to one embodiment. In some examples, the method 600 includes additional steps to initiate the copy packet queue as discussed in relation to block 502 of FIG. 5. Method 600 begins at block 602 where a network element, such as transmitting network element 205, including control module 210, determines a round trip time (RTT) for a network hop between the first network element and the second network element. For example, the control module 210 transmits a measurement packet to the receiving element 255, where the measurement packet is returned back to the control module 210 by the control module 260. The control module 210 then records the time it took for the measurement packet to be received back at the control module 210. The RTT is used by the control module 210 to determine how long it takes for a packet in the packet stream 302 to be sent to the receiving network element 255, and for the receiving element to drop the packet and return a drop packet notification such as control packet 402. As described herein, if a drop packet notification for a particular packet count is not received from the receiving element within the RTT from when the packet was transmitted, the packet is inferred to be delivered, assuming the link error rate is negligible. In another example, the control module 260 periodically transmits a control packet with its current packet count from the packet counter 261 to ensure there is no discrepancy from the control module 210.

At block 604, the transmitting network element 205, including control module 210, determines a buffer size for the copy packet queue based on the RTT for the network hop. For example, since a transmitted packet can be assumed to be not-dropped after the RTT from the time the packet was transmitted has expired, thus a packet copy is no longer needed. The control module 210 then only needs to determine a buffer size for the copy packet queue to be large enough for the packets that can be assumed to be in transit, using the RTT.

For example, the link between network elements 104 and 106 may have a bandwidth capacity of 100 gigabits per second (Gb/s), and the RTT measured by the measurement packet between network elements 104 and 106 is 1 microsecond (μs) (where the link latency is 0.5 μs). For this example, there may be approximately 100000 bits in transit between the network elements 104 and 106, which in turn needs a buffer of at least a 100000 bits or 12.5 kilobytes to be able to guarantee all potential retransmissions from the copy packet queue 220.

At block 606, the transmitting network element 205, including control module 210, allocates storage space for the copy packet queue based on the determined buffer size. In some examples, the storage/buffer space for the copy packet queue can be utilized for other networking functions when congestion control is not an issue. For example, the copy packet queue may only be initiated and allocated storage space upon reception of a congestion notification from the receiving element, indicating congestion and a dropped packet may occur.

Figure 7:
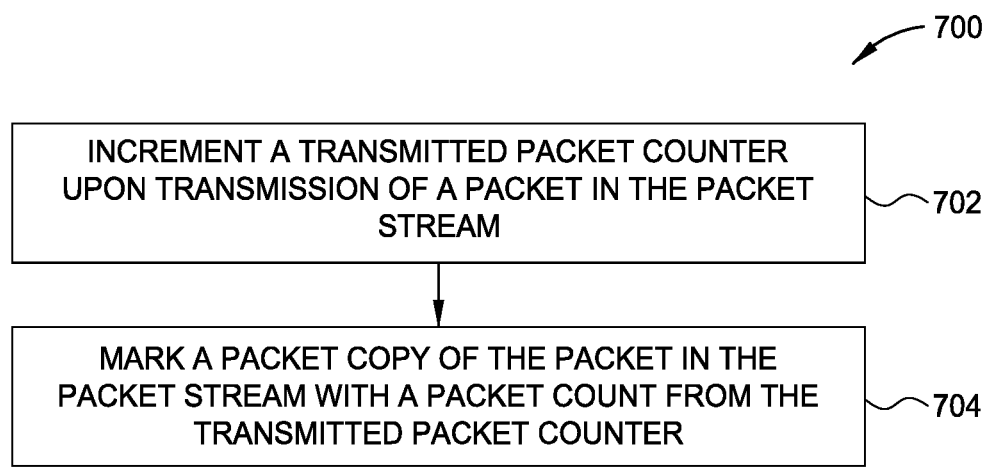
FIG. 7 is a method for transmitting a packet stream from a first network element to a second network element, according to one embodiment.

FIG. 7 is a method for transmitting a packet stream from a first network element to a second network element, according to one embodiment. In some examples, the method 700 includes additional steps to transmit a packet stream as discussed in relation to block 504 of FIG. 5. Method 700 begins at block 702 where a network element, such as transmitting network element 205, increments a transmitted packet counter upon transmission of a packet in the packet stream. For example, as described in relation to FIGS. 2-4A, the control module 210 increments the output packet counter 211 upon transmitting each packet from the packet queue 215 in order to track which packets are in transit and/or may be dropped by the second network element (receiving network element 255).

At block 704, the transmitting network element 205, including control module 210, marks a packet copy of the transmitted packet in the copy packet queue with a packet count from the transmitted packet counter. This mark allows for the control module 210 to identify the copy packet by the packet count when retransmission begins.

Figure 8:
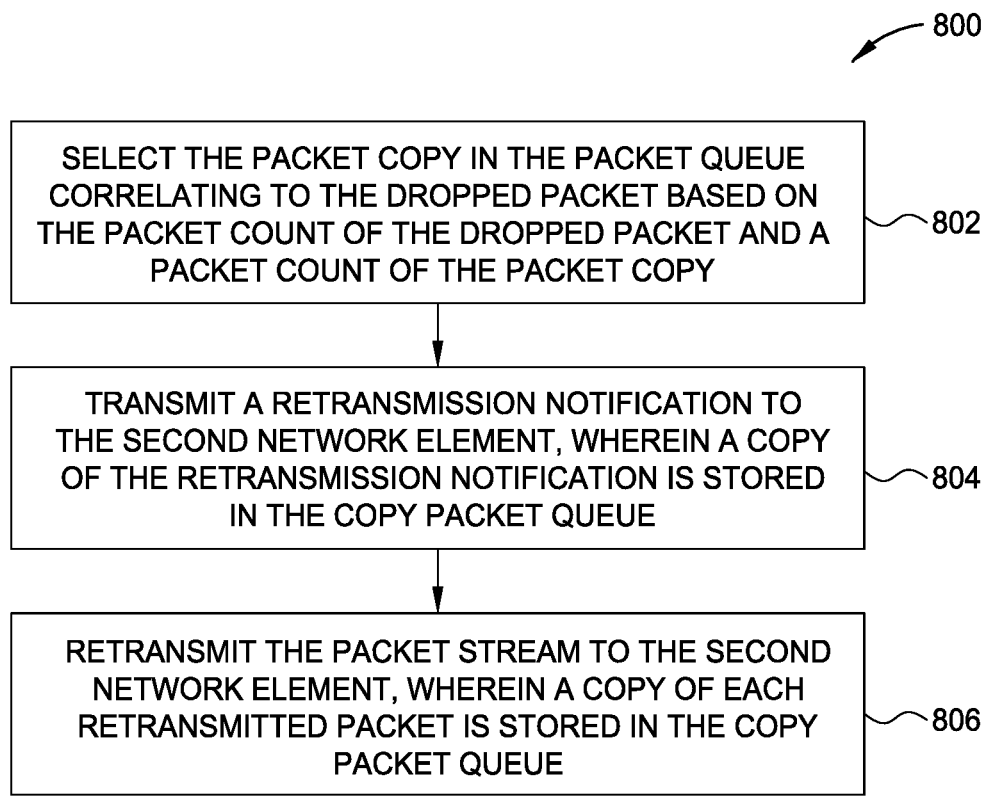
FIG. 8 is a method for retransmitting a packet stream from a first network element to a second network element, according to one embodiment.

FIG. 8 is a method for retransmitting a packet stream from a first network element to a second network element, according to one embodiment. In some examples, the method 800 includes additional steps to retransmit the packet stream from the first network element to the second network element as discussed in relation to block 508 of FIG. 5. In some examples, the drop packet notification (e.g., control packet 402) comprises a packet count of the dropped packet (e.g., packet count 129). Method 800 begins at block 802 where a network element, such as transmitting network element 205, including control module 210, selects the packet copy in the packet queue correlating to the dropped packet based on the packet count of the dropped packet and a packet count of the packet copy. For example, as discussed in relation to FIG. 4A, the control module 210 selects the packet 359 from the copy packet queue 220 for retransmission.

At block 804, the transmitting network element 205, including control module 210, transmits a retransmission notification to the second network element, wherein a copy of the retransmission notification is stored in the copy packet queue. For example, the control module 210 transmits the control packet 404 to the receiving element 255 indicating that retransmission has begun and that the next packet received will include the packet count of the packet 359 (packet count 129). In order to track retransmission progression, the control module 210 also stores a copy of the control packet 404 in the copy packet queue 220.

At block 806, the transmitting network element 205, including control module 210, retransmits the packet stream to the second network element, wherein a copy of each retransmitted packet is stored in the copy packet queue. For example, the control module 210 retransmits the packet 359 (packet count 129) to the receiving element 255 and stores a copy of the packet 359 in the copy packet queue 220 again in order to ensure the retransmitted packet is delivered or retransmitted again if dropped.

Figure 9:
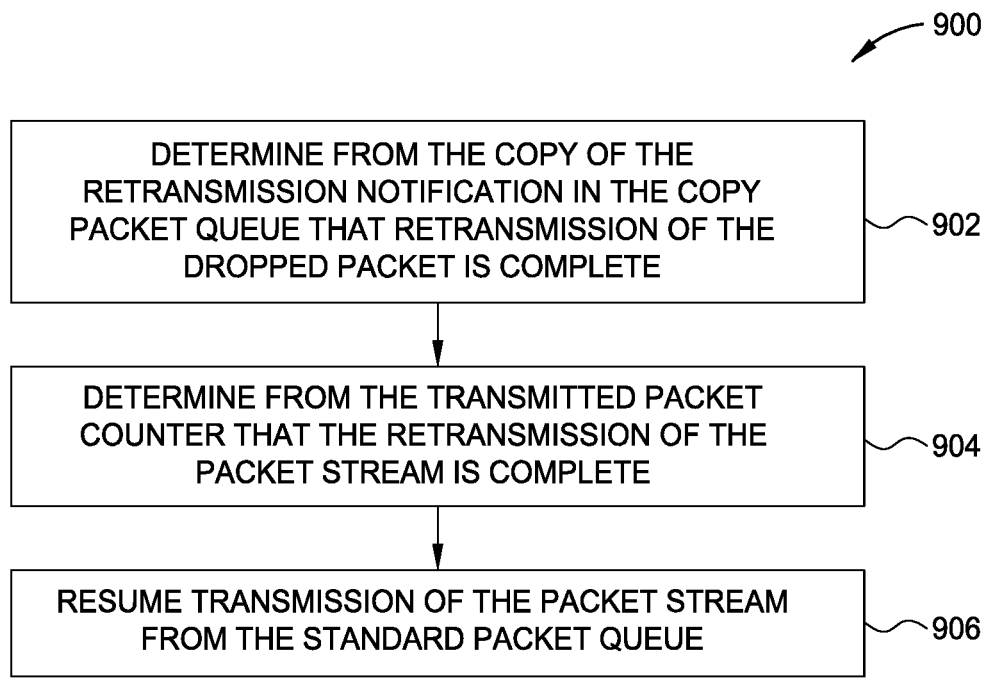
FIG. 9 is a method for providing for packet drops in a lossless protocol, according to one embodiment.

FIG. 9 is a method for providing for packet drops in a lossless protocol, according to one embodiment. Method 900 begins at block 902 where a network element, such as transmitting network element 205, including control module 210, determines from the copy of the retransmission notification in the copy packet queue that retransmission of the dropped packet is complete.

At block 904, the transmitting network element 205, including control module 210, determines from the transmitted packet counter that the retransmission of the packet stream is complete. For example, once the packet 363 (packet count 133) is retransmitted, the control module will resume the transmission of the packet queue 215, such as at block 906, where the transmitting network element 205, including control module 210, resumes transmission of the packet stream from the standard packet queue.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the control module) or related data available in the cloud. For example, the control module could execute on a computing system in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

I claim:

1. A method comprising:
   initiating at a first network element a copy packet queue for packets transmitted by the first network element;

transmitting a packet stream from the first network element to a second network element from a first packet queue storing a copy of each packet of the transmitted packet stream in the copy packet queue at the first network element;

receiving a drop packet notification at the first network element from the second network element, where the drop packet notification identifies a packet count of a dropped packet;

selecting a packet copy stored in the copy packet queue correlating to the dropped packet based on the packet count of the dropped packet and a packet count of the packet copy;

transmitting a retransmission notification to the second network element, wherein a copy of the retransmission notification is stored in the copy packet queue; and after the transmission of the retransmission notification, retransmitting the packet stream from the first network element to the second network element using stored packet copies in the copy packet queue, where the retransmitted packet stream begins at the selected packet copy stored in the copy packet queue, and wherein a copy of each retransmitted packet of the retransmitted packet stream is stored in the copy packet queue.

2. The method of claim 1, wherein initiating the copy packet queue comprises:

determining a round trip time (RU) for a network hop between the first network element and the second network element;

determining a buffer size for the copy packet queue based on the RU for the network hop; and allocating storage space for the copy packet queue based on the determined buffer size.

3. The method of claim 1, wherein transmitting the packet stream from the first network element to the second network element comprises:

incrementing a transmitted packet counter upon transmission of a first packet in the packet stream; and marking a packet copy of the first packet in the packet stream with a packet count from the transmitted packet counter.

4. The method of claim 3, wherein the drop packet notification comprises the packet count of the dropped packet.

5. The method claim 4, further comprising:

determining from the copy of the retransmission notification in the copy packet queue that retransmission of the dropped packet is complete;

determining from the transmitted packet counter that the retransmission of the packet stream is complete; and resuming transmission of the packet stream from the first packet queue.

6. The method of claim 1, further comprising:

transmitting a synchronization packet from the first network element to the second network element prior to transmitting the packet stream.

7. The method of claim 1, wherein the copy packet queue comprises a looping queue, wherein a first received packet copy is discarded when a new packet copy is stored.

8. A system, comprising:

a processor; and a memory comprising instructions which, when executed on the processor, performs an operation, the operation comprising:

initiating at a first network element a copy packet queue for packets transmitted by the first network element;

transmitting a packet stream from the first network element to a second network element from a first packet queue;

storing a copy of each packet of the transmitted packet stream in the copy packet queue at the first network element;

receiving a drop packet notification at the first network element from the second network element, where the drop packet notification identifies a packet count of a dropped packet;

selecting a packet copy stored in the copy packet queue correlating to the dropped packet based on the packet count of the dropped packet and a packet count of the packet copy;

transmitting a retransmission notification to the second network element, wherein a copy of the retransmission notification is stored in the copy packet queue; and after the transmission of the retransmission notification, retransmitting the packet stream from the first network element to the second network element using stored packet copies in the copy packet queue, where the retransmitted packet stream begins at the selected packet copy in the copy packet queue, and wherein a copy of each retransmitted packet of the retransmitted packet stream is stored in the copy packet queue.

9. The system of claim 8, wherein initiating the copy packet queue comprises:

determining a round trip time (RU) for a network hop between the first network element and the second network element;

determining a buffer size for the copy packet queue based on the RU for the network hop; and allocating storage space for the copy packet queue based on the determined buffer size.

10. The system of claim 8, wherein transmitting the packet stream from the first network element to the second network element comprises:

incrementing a transmitted packet counter upon transmission of a first packet in the packet stream; and marking a packet copy of the first packet in the packet stream with a packet count from the transmitted packet counter.

11. The system of claim 10, wherein the drop packet notification comprises the packet count of the dropped packet.

12. The system of claim 11, wherein the operation further comprises:

determining from the copy of the retransmission notification in the copy packet queue that retransmission of the dropped packet is complete;

determining from the transmitted packet counter that the retransmission of the packet stream is complete; and resuming transmission of the packet stream from the first packet queue.

13. The system of claim 8, wherein the operation further comprises:

transmitting a synchronization packet from the first network element to the second network element prior to transmitting the packet stream.

14. The system of claim 8, wherein the copy packet queue comprises a looping queue, wherein a first received packet copy is discarded when a new packet copy is stored.

15. A computer program product comprising a non-transitory computer-readable medium program having program instructions embodied therewith, the program instructions executable by a processor to perform an operation, the operation comprising:

initiating at a first network element a copy packet queue for packets transmitted by the first network element;

transmitting a packet stream from the first network element to a second network element from a first packet queue;

storing a copy of each packet of the transmitted packet stream in the copy packet queue at the first network element;

receiving a drop packet notification at the first network element from the second network element, where the drop packet notification identifies a packet count of a dropped packet;

selecting a packet copy stored in the copy packet queue correlating to the dropped packet based on the packet count of the dropped packet and a packet count of the packet copy;

transmitting a retransmission notification to the second network element, wherein a copy of the retransmission notification is stored in the copy packet queue; and after the transmission of the retransmission notification, retransmitting the packet stream from the first network element to the second network element using stored packet copies in the copy packet queue, where the retransmitted packet stream begins at the selected packet copy in the copy packet queue correlating to the dropped packet, and wherein a copy of each retransmitted packet of the retransmitted packet stream is stored in the copy packet queue.

16. The computer program product of claim 15, wherein initiating the copy packet queue comprises:

determining a round trip time (RU) for a network hop between the first network element and the second network element;

determining a buffer size for the copy packet queue based on the RU for the network hop; and allocating storage space for the copy packet queue based on the determined buffer size.

17. The computer program product of claim 15, wherein transmitting the packet stream from the first network element to the second network element comprises:

incrementing a transmitted packet counter upon transmission of a first packet in the packet stream; and marking a packet copy of the first packet in the packet stream with a packet count from the transmitted packet counter.

18. The computer program product of claim 17, wherein the drop packet notification comprises the packet count of the dropped packet.

19. The computer program product of claim 18, wherein the operation further comprises:

determining from the copy of the retransmission notification in the copy packet queue that retransmission of the dropped packet is complete;

determining from the transmitted packet counter that the retransmission of the packet stream is complete; and resuming transmission of the packet stream from the first packet queue.

20. The computer program product of claim 15, wherein the operation further comprises:

transmitting a synchronization packet from the first network element to the second network element prior to transmitting the packet stream.

* * * * *

UNITED STATES PATENT AND TRADEMARK OFFICE
CERTIFICATE OF CORRECTION

PATENT NO. : 11,070,321 B2
APPLICATION NO. : 16/172708
DATED : July 20, 2021
INVENTOR(S) : Vanini Page 1 of 1

It is certified that error appears in the above-identified patent and that said Letters Patent is hereby corrected as shown below:

In the Claims

In Column 13, Line 30, in Claim 2, delete "(RU)" and insert -- (RTT) --, therefor.

In Column 13, Line 34, in Claim 2, delete "RU" and insert -- RTT --, therefor.

In Column 13, Line 48, in Claim 5, after "method" insert -- of --.

In Column 14, Line 33, in Claim 9, delete "(RU)" and insert -- (RTT) --, therefor.

In Column 14, Line 37, in Claim 9, delete "RU" and insert -- RTT --, therefor.

In Column 16, Line 1, in Claim 16, delete "(RU)" and insert -- (RTT) --, therefor.

In Column 16, Line 5, in Claim 16, delete "RU" and insert -- RTT --, therefor.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*